(12) United States Patent
Tabuchi et al.

(10) Patent No.: US 7,016,598 B2
(45) Date of Patent: Mar. 21, 2006

(54) DATA RECORDING/REPRODUCTION APPARATUS AND DATA RECORDING/REPRODUCTION METHOD

(75) Inventors: Makoto Tabuchi, Kanagawa (JP); Ichiro Fujisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1079 days.

(21) Appl. No.: 09/827,463

(22) Filed: Apr. 6, 2001

(65) Prior Publication Data

US 2002/0001450 A1    Jan. 3, 2002

(30) Foreign Application Priority Data

Apr. 7, 2000   (JP)   ............... 2000-111945

(51) Int. Cl.
*H04N 5/93*   (2006.01)

(52) U.S. Cl. ........................ 386/55; 386/125

(58) Field of Classification Search ............ 386/46, 386/52, 55, 65, 95, 96, 113, 125
See application file for complete search history.

(56) References Cited

U.S. PATENT DOCUMENTS

| | | | |
|---|---|---|---|
| 5,841,740 A | | 11/1998 | Fuijita et al. |
| 5,933,570 A | * | 8/1999 | Fujita ................. 386/96 |
| 6,236,802 B1 | | 5/2001 | Yamamoto |
| 6,272,279 B1 | | 8/2001 | Yokoyama et al. |
| 6,301,432 B1 | * | 10/2001 | Miyawaki et al. ........ 386/113 |
| 2003/0012550 A1 | | 1/2003 | Sakai et al. |

FOREIGN PATENT DOCUMENTS

| | | |
|---|---|---|
| EP | 0 863 510 | 9/1998 |
| EP | 1 001 623 | 5/2000 |
| GB | 2 283 360 | 5/1995 |
| JP | 09330552 A * | 12/1997 |
| JP | 10248048 A * | 9/1998 |

OTHER PUBLICATIONS

Patent Abstracts of Japan, JP 11 146330 A (SONY CORP), May 28, 1999.
Patent Abstracts of Japan, JP 10 248048 A (SONY CORP), Sep. 14, 1998.
Patent Abstracts of Japan, JP 10 257388 A (Hitachi Denshi Ltd), Sep. 25, 1998.

* cited by examiner

*Primary Examiner*—Huy Nguyen
(74) *Attorney, Agent, or Firm*—Frommer Lawrence & Haug LLP; William S. Frommer

(57) ABSTRACT

A data recording/reproduction apparatus and a data recording/reproduction method according to the invention can effectively and economically utilize the limited resource of hard discs when editing files by defining the editing points on a plurality of data recorded on a non-linearly reproducible recording medium.

4 Claims, 4 Drawing Sheets

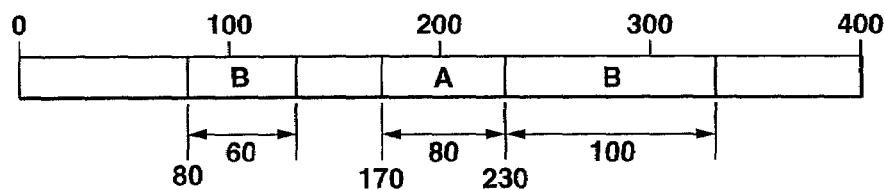
FIG.1A
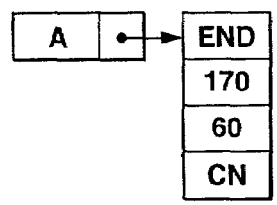
FIG.1B
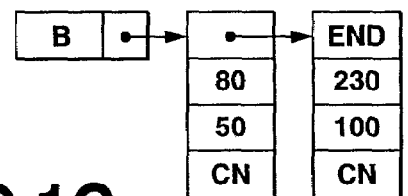
FIG.1C
| FILE NAME | REPLAY START TIME | REPLAY END TIME |
|---|---|---|
| A | 10 | 50 |
| B | 20 | 60 |
FIG.2A
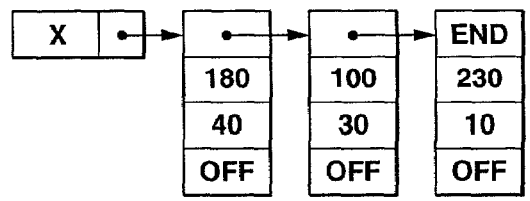
FIG.2B

DATA RECORDING/REPRODUCTION APPARATUS AND DATA RECORDING/REPRODUCTION METHOD

BACKGROUND OF THE INVENTION

1. Field of the Invention

This invention relates to a data recording/reproduction apparatus and a data recording/reproduction method for editing a plurality of data recorded on a recording medium adapted to non-linear data reproduction by defining a plurality of editing points.

2. Description of Related Background Art

In recent years, the number of channels available for transmitting information in the form of electric signals has been remarkably increased with the advent of CATV (cable television). As a result, there is a strong demand for apparatus adapted to simultaneously record a number of different sets of audio/video data and/or reproduce such data from a single audio/video data recording/reproduction apparatus. To meet this demand, apparatus called video servers and adapted to record and reproduce audio/video data have been developed and widely marketed.

A video server is typically connected to a number of large capacity hard disc drives adapted to non-linear data reproduction to make the total recording capacity amount to tens to hundreds of several gigabytes. Such a video server is suited to record a huge volume of data including audio data and video data. Particularly, with a video server, any selected audio data or video data can be accessed in a very short period of time so that it can advantageously be used as recording/reproduction apparatus applied to editing data.

The video server maintains information for managing the locations where the files store in each hard disc are actually found and the information is used to manage the audio/video data recorded on the hard disc. Additionally, when the video server is used to edit audio/video data, it prepares file editing information that is referred to as VFL (virtual file list) and include continuous data length information. Thus, an editing operation proceeds as a VFL is prepared by means of the video server by specifying and retrieving file name information and continuous data length information. The video server simply reproduces the VFL without re-recoding the retrieved audio/video data on a hard disc during the editing operation and then reads the edited audio/video data from the related hard disc by referring to the VFL during the subsequent replay operation.

Japanese Patent Application No. 7-320185 (Japanese Patent Application Laid-Open Publication No. 9-163310) and U.S. Pat. No. 5,841,740 disclose a technology on the VFL invented by the applicant of the present patent application.

Now, the technology disclosed in the above patent documents will be described below.

Assume that file A and file B, both containing audio and/or video data, are stored on a hard disc in a video server as shown in FIG. 1A. FIG. 1A is a schematic illustration of the address space on a hard disc. The file A is recorded continuously at addresses 170 through 230 on the hard disc, using a total of sixty addresses. On the other hand, the file B is recorded at addresses 80 through 130 and 230 through 330. In other words, the file B is recorded discontinuously on the hard disc.

In the video server, the information showing the location of each of the files recorded on the corresponding hard disc of the video server is stored in a predetermined memory. FIGS. 1B and 1C illustrate the file system information of the file A and that of the file B. The file system information of the video server includes file entries and record entries. Each file entry contains the file name and the pointer information for pointing the corresponding record entry. Each record entry contains the address of the head of each continuous recording area and the length of the continuous recording area from the head.

As shown in FIG. 1A and described above, the file A is recorded continuously at addresses 170 through 230 on the hard disc, using a total of sixty addresses. Since the file A is not recorded in any other area, the file system information of the file A includes a file entry containing the fine name "A" and the pointer information for pointing the corresponding record entry and a record entry containing the location of the head, or address "170", the continuous recording area for "60" addresses starting from there and "END" indicating that the file A is not stored in any other area.

Also as shown in FIG. 1A and described above, the file system information of the file B that is stored discontinuously on the hard disc includes a file entry containing the file name "B" and the pointer information for pointing the corresponding record entry and a record entry containing the location of the head, or address "80", the continuous recording area for "50" addresses starting from there, the location of the next head, or address "230", the continuous recording area for "100" addresses starting from there and "END" indicating that the file B is not stored any other area.

The files recorded in the video server are then managed by means of the file system information and, for instance, a replay instruction specifying a file is input from the host, the video server confirms the address value to be accessed by using the file system information so that it can actually access the file stored on a specific hard disc and reproduce the data of the file.

Now, an operation of editing some of the files stored in the video server by using an editing machine connected to the video server on the basis of the file system will be discussed below. Assume that the editing operation consists in connecting part of the file A and part of the file B to produce a new file.

Firstly, both the file A and the file B are reproduced from the video server and sent to the editing machine. Assume here that the position at the 10-th address as counted from the head of the file A is the replay starting point (IN point) and the position at the 50-th address as counted form the head of the file A is the replay ending point (OUT point) of the file A, whereas the position at the 20-th address as counted from the head of the file B is the replay starting point (IN-point) and the position at the 60-th address as counted from the head of the file B is the replay ending point (OUT-point) of the file B. Then, the editing machine edits the files A and B by following a predetermined editing sequence.

When the editing machine completes the operation of editing the two files, it sends the file of audio and/or video data produced as a result of the editing operation back to the video server. A VFL shows the data indicating the outcome of the editing operation.

A VFL will be described by referring to FIGS. 2A and 2B.

As shown in FIGS. 2A and 2B, the VFL shows the file names and the replay starting position and the replay ending position of each of the files. The replay stating position and the replay ending position are indicates by the respective address values obtained by defining the address of the head of the file as address 0. It will be seen that FIGS. 2A and 2B show the VFL for the file A and the file B.

Upon receiving the VFL as input, the video server prepares file system information (on file name "X") independently from the above described file system information.

More specifically, since the head position of the file A is known to be as "170" from the file system information on the file A as shown in FIG. 1B, the actual IN-point on the hard disc is 170+10, or "180". As data are recorded continuously for an area corresponding to 40 addresses (=50−10), the continuous recording area is "40". On the other hand, the head position of the file B is known to be as "100" from the file system information on the file B and data are recorded for an area corresponding to 40 addresses from the VFL. However, the data are recorded only continuously down to address "130" so that the data corresponding to 10 addresses are not found there because the head position is "100". Then, the next continuous area starts from "230" and therefore all the data from the IN-point to the OUT-point can be reproduced by adding the data for "10" addresses starting from address "230". Thus, the file system information on the file "X" obtained by the editing operation will be like the one shown in FIG. 2B.

Note that "ON" or "OFF" may be shown in the bottom row of each file entry to represents an erasable flag. However, since the files have to be erased after the editing operation, "OFF" is actually shown at the bottom of each file entry.

With the above arrangement, when reproducing the file obtained by the editing operation from the video server, it is now possible to reproduce the file on the basis of the file system information on the file "X".

Now, when editing files by means of the video server, it is possible to use a technique of special effects to the video data (to be referred to as video effects) near the IN-point from which a file is selected and the OUT-point at which the selection of the file ends according to the intension of the editor.

However, when realizing such video effects, conventionally, it is necessary to read the two files, if two files are involved, from the hard disc by way of different respective ports, processing the files for the video effects and then recording them on the hard disc or some other hard disc before they are reproduced. Therefore, with the conventional editing technique involving the video effects, the files subjected to the operation of processing them for the video effects need to be recorded repeatedly on the hard discs to consume the limited resource of hard discs.

SUMMARY OF THE INVENTION

In view of the above identified problem, it is therefore the object of the present invention to provide a data recording/reproduction apparatus and a data recording/reproduction method that can effectively and economically utilize the limited resource of hard discs when editing files involving video effects.

In the first aspect of the invention, the above object is achieved by providing a data recording/reproduction apparatus provided with a plurality of input/output means for inputting and outputting data including video data and audio data and adapted to record data including video data and audio data input through said input/output means on a plurality of pieces of recording medium non-linearly accessible in allocated time slots and reproduce and output through said input/output means any of the data recorded on said recording medium including video data and audio data, said apparatus comprising:

a recording/reproduction means for recording material data input through said input/output means on said recording medium and reproducing and outputting through said input/output means any of said material data from said recording medium;

a first editing means for generating a first piece of editing information on the selection of editing points including a starting point and an ending point of a predetermined storage area storing a first material data and a starting point and an ending point of a predetermined storage area storing a second material data to be inserted in said first material data and the actual insertion of said second material data in said first material data;

a video effect processing means for processing the video data in the vicinity of each of said editing point for predetermined specific video effects;

a video-effect-processed data extracting means for extracting the data processed for the video effects by said video effect processing means;

a recording control means for controlling said recording/reproduction means so as to record said video-effect-processed data extracted by said video-effect-processed data extracting means on said recording medium;

a second editing means for inserting said video-effect-processed data recorded by said recording/reproduction means in said first material data and generating a second piece of editing information for inserting said second material data as modified by the insertion of said video-effect-processed data in said first material data;

a virtual file generating means for generating a first virtual file describing the recording area of said first material data on said recording medium on the basis of the first piece of editing information generated by said first editing means, a second virtual file describing the recording area of said second material data on said recording medium on the basis of the second piece of editing information generated by said second piece of editing information and a third virtual file describing the recording area of said video-effect-processed data on said recording medium; and a reproduction control means for control said recording/reproduction means so as to reproduce the first material data, the second material data and the video-effect-processed data recorded on said recording medium on the basis of the first virtual file, the second virtual file and the third virtual file generated by said virtual file generating means.

In the second aspect of the invention, the above object is achieved by providing a data recording/reproduction method adapted to use a plurality of input/output means for inputting and outputting data including video data and audio data so as to record data including video data and audio data input through said input/output means on a plurality of pieces of recording medium non-linearly accessible in allocated time slots and reproduce and output through said input/output means any of the data recorded on said recording medium including video data and audio data, said method comprising steps of:

selecting editing points including a starting point and an ending point of a predetermined storage area storing a first material data and a starting point and an ending point of a predetermined storage area storing a second material data to be inserted in said first material data;

processing the video data in the vicinity of each of said editing point for predetermined specific video effects;

extracting the video-effect-processed data processed for the video effects;

recording said extracted video-effect-processed data extracted on said recording medium;

generating a first virtual file describing the recording area of said first material data on said recording medium, a second virtual file describing the recording area of said second material data on said recording medium and a third virtual file describing the recording area of said video-effect-processed data on said recording medium; and reproducing the first material data, the second material data and the video-effect-processed data recorded on said recording medium on the basis of the first virtual file, the second virtual file and the third virtual file generated by said virtual file generating means.

Thus, a data recording/reproduction apparatus and a data recording/reproduction method according to the invention can effectively and economically utilize the limited resource of hard discs when editing files involving the video effects.

BRIEF DESCRIPTION OF THE DRAWINGS

FIG. 1A is a schematic illustration of an address space on a hard disc.

FIG. 1B is a schematic illustration of the file system information of file A in FIG. 1A.

FIG. 1C is a schematic illustration of the file system information of file B in FIG. 1A.

FIG. 2A is a table of VFL values including file names, reproduction starting points and reproduction ending points.

FIG. 2B is another table of VFL values including file names, reproduction starting points and reproduction ending points.

DETAILED DESCRIPTION OF THE INVENTION

Now, the present invention will be described by referring to the accompanying drawings that illustrate preferred embodiments of the invention.

Figure 3:
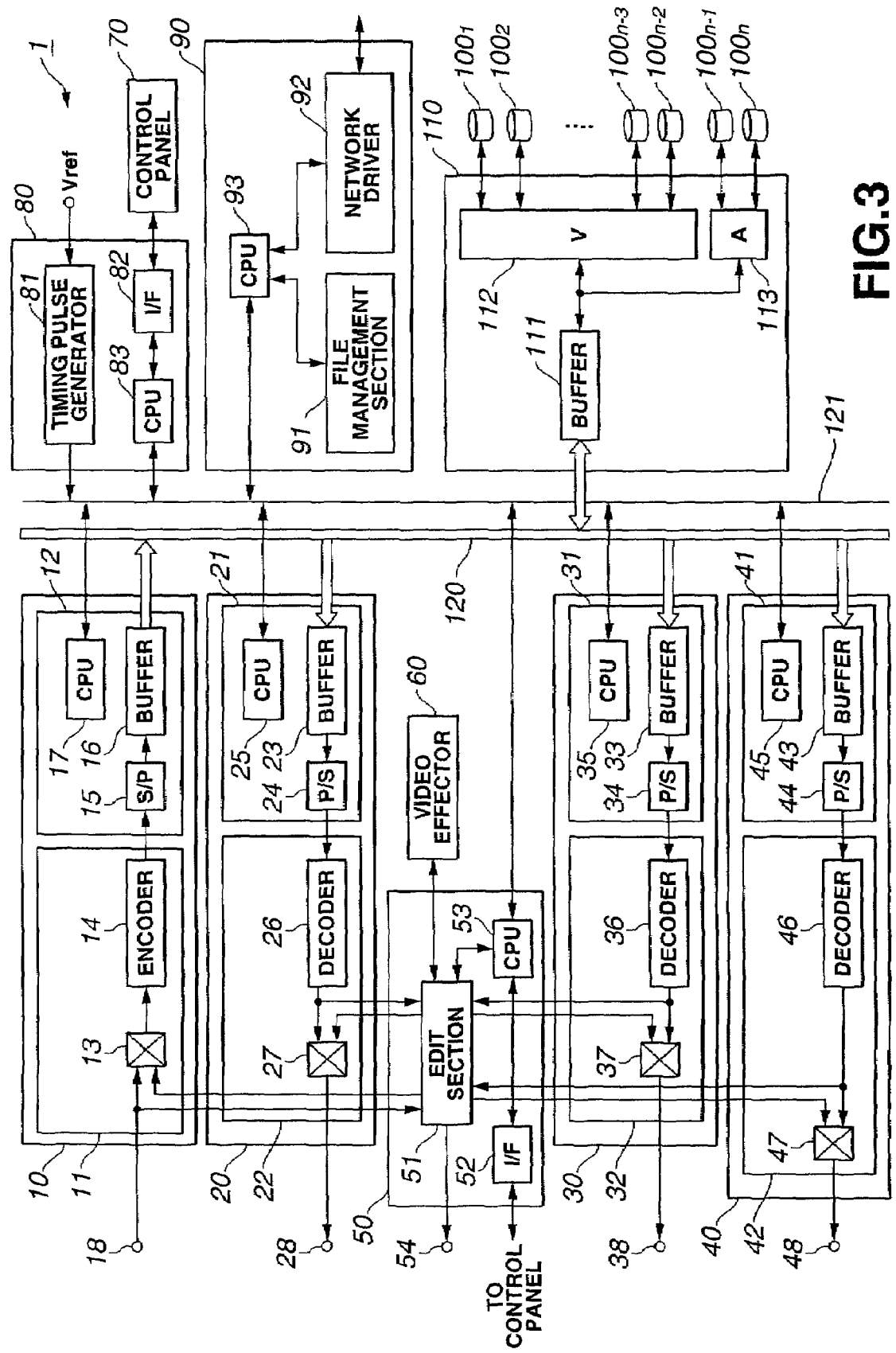
FIG. 3 is a schematic block diagram of an embodiment of A/V server, illustrating its configuration.

The present invention is typically applied to an A/V (audio/video) server having a configuration as shown in FIG. 3. The A/V server 1 is adapted to record audio/video data (to be referred to as A/V data hereinafter) on a recording medium and reproduce A/V data therefrom (to be referred to as recording/reproduction hereinafter). In addition to recording/reproducing A/V data, the A/V server 1 can be used to edit A/V data by the user by operating a control panel as will be described hereinafter.

The A/V server 1 comprises a recording port 10, reproduction ports 20, 30, 40, an editing manager 50, a video effecter 60, a control panel 70, a timing manager 80, a file manager 90 and an HDD array 10 comprising as recording medium a plurality of HDDs $100_1, 100_2, \ldots, 100_{n-3}, 100_{n-2}, 100_{n-1}$ and $100_n$ (n representing an integer).

The A/V server 1 additionally comprises a data bus 120 for transferring data between the ports including the recording port 10 and the reproduction ports 20, 30, 40 and the HDD array 110 and a control bus 121 for transferring control data to be used for controlling the components. Thus, the A/V server 1 comprises a total of four input/output processing systems including an input processing section and three output processing sections.

The recording port 10 operates as input processing section for recording the signals input through input terminal 18 on the HDD array 110. The recording port 10 comprises a data input/output section 11 and a data management section 12. The data input/output section 11 has a selector 13 and an encoder 14, while the data management section 12 has a serial/parallel converter section (to be referred to as S/P hereinafter) 15, a buffer 16 and CPU 17.

The selector 13 is used to select data for encoding. More specifically the selector 13 selects either data including audio/video data such as data adapted to SDIs (serial digital interfaces) conforming to SMPTE (Society of Motion Picture and Television Engineers)-259 and those adapted to SDTIs (serial digital transfer interfaces) conforming to SMPTE-305M that are input through the input terminal 18 or data output from the editing section 51 of the editing manager 50 and outputs them to the encoder 14 that is arranged downstream relative to the selector 13.

The encoder 14 encodes the signals output from the selector 13 in a predetermined format. More specifically, the encoder 14 processes the input signals for compression coding according to the MPEG (Moving Picture Experts Group) system. Note, however, that the encoder 14 operates not only for compression coding but also for transforming them in a format adapted for recording on any of the HDDs $100_1, 100_2, \ldots, 100_{n-3}, 100_{n-2}, 100_{n-1}$ and $100_n$. Therefore, for example, it may extract audio signals and/or video signals from the data adapted to SDIs and/or audio signals and/or video signals from the data adapted to SDTIs. In the following description, the encoder 14 operate to process input signals for compression coding before outputting them. The compressed data produced by the encoder 14 as a result of compression coding are then input to the S/P 15 of the data management section 12.

The S/P 15 of the data management section 12 performs serial/parallel conversion on the compressed data input from the encoder 14 so that they may be written on any of the HDDs $100_1, 100_2, \ldots, 100_{n-3}, 100_{n-2}, 100_{n-1}$ and $100_n$. The data obtained by the serial/parallel conversion of the S/P 15 are then fed to the downstream buffer 16.

The buffer is used to temporarily store the data output from the S/P 15 and sends them to the data bus 120 on a time-division multiplex basis. Although not shown, the buffer 16 is adapted to store individually the data output from the S/P 15. The buffer 16 is also adapted to input data from the S/P 15 on an ad hoc basis and, as a time slot from timing pulse generator 81, which will be described hereinafter, is assigned to the CPU 17, it outputs the data it buffers to the data bus 120 in the time slot within a permitted period of time under the control of the CPU 17.

The data bus 120 that of the type referred to as SBX (Spydar Bus eXtension) and, although not shown, comprises an uplink bus for transmitting data in the sense of data recording and a downlink bus for transmitting in the sense of data reproduction. Each of the uplink bus and the downlink bus by turn has a plurality of buses so that the parallel data obtained from the corresponding serial data as a result of the serial/parallel conversion of the S/P 15 may be transmitted individually. Thus, the data output from the buffer 16 are transmitted to the HDD array 110 by way of the corresponding respective buses of the data bus 120. Additionally, although not shown, an output processing section is arranged downstream relative to the buffer 16 so that each of the data output from the buffer 16 is multiplexed with a command for writing the data on any of the HDDs $100_1$, $100_2, \ldots, 100_{n-3}, 100_{n-2}, 100_{n-1}$ and $100_n$ according to the transmission format of the data bus 120.

The CPU 17 operates to control the operational sections of the recording port 10 on the basis of the control signal, which may be an external command, transmitted from the control panel 70, which will be described in greater detail hereinafter, by way of the control bus 121. If necessary, the CPU 17 transfers the control signal given to it to the CPU 53 of the editing manager 50. Additionally, the CPU 17 controls the output of any of the data held by the buffer 16 on the basis of the time slot assigned to it by the timing pulse generator 81.

The recording port 10 having the above described configuration is adapted to receive video data and audio data as input.

The reproduction port 20, on the other hand, operates as output processing section for processing any of the data recorded in the HDD array 110 when outputting it externally. It comprises a data management section 21 and a data input/output section 22.

The data management section 21 by turn comprises a buffer 23, a parallel/serial converter section (to be referred to as P/S hereinafter) 24 and a CPU 25, whereas the data input/output section 22 comprises a decoder 26 and a selector 27.

The buffer 23 is used to temporarily store the data transmitted thereto from the HDD array 110 by way of the data bus 120. Although not shown, the buffer 23 is adapted to store individually the data output in parallel from the HDD array 110. As a time slot from the timing pulse generator 81 is assigned to the CPU 25, the buffer 23 reads and input data from the HDD array 110 under the control of the CPU 25.

Each of the data output from the HDD array 110 is multiplexed with a status for the command for writing data on any of the HDDs $100_1, 100_2, \ldots, 100_{n-3}, 100_{n-2}, 100_{n-1}$ and $100_n$ according to the transmission format of the data bus 120. The data are then divided and transmitted respectively by way of the plurality of buses of the downlink bus of the data bus 120. With this arrangement, the A/V server 1 is made relatively free from factors that can give rise to errors such as collisions of data of the input system and those of the output system and adapted to record and reproduce data simultaneously as data are transmitted data on the basis of the time slot assigned to it. The data input to the buffer 23 are buffered there and then fed to the downstream P/S 24.

The P/S 24 transforms the parallel data input form the buffer 23 into serial data. The serial data obtained by the P/S 24 as a result of parallel/serial conversion are then fed to the decoder 26 of the data input/output section 22.

The CPU 25 operates to control the operational sections of the reproduction port 20 on the basis of the control signal transmitted from the control bus 121. If necessary, the CPU 25 transfers the control signal given to it to the CPU 53 of the editing manager 50. Additionally, the CPU 25 operates to obtain the right of use of the data bus 120 on the basis of the time slot assigned to it and input the related data to the buffer 23.

The decoder 26 of the data input/output section 22 operates to decode the serial data input from the P/S 24 by performing a predetermined processing operation on the data for decoding. If the data reproduced from any of the HDDs 100 are compressed, the decoder 26 expands them and transforms them typically into SDI data before outputting them. The data including video data and audio data obtained as a result of a decoding operation of the decoder 26 are input to the selector 27 and the editing section 51 of the editing manager 50.

The selector 27 selects the signals to be output externally by way of the output terminal 28. More specifically the selector 27 selects either the data output from the decoder 26 or the data output from the editing section 51 of the editing manager 50 and supplies them to the output terminal 28 as SDI data or SDTI data.

The reproduction port 20 having the above described configuration is adapted to output video data and audio data for 4 channels or 8 channels.

Both the reproduction ports 30 and 40 have a configuration similar to that of the reproduction port 20.

More specifically, the reproduction port 30 comprises a data management section 31 and a data input/output section 32. The data management section 31 by turn comprises a buffer 33 for temporarily storing the data from the HDD array 110, a P/S 34 for transforming the parallel data from the buffer 33 into serial data and a CPU 35 for controlling the components of the reproduction port 30. On the other hand, the data input/output section 32 comprises a decoder 36 for decoding the serial data input from the P/S 34 and a selector 37 for selecting either the data output from the decoder 36 or the data output from the editing section 51 and supplies them to the output terminal 38.

On the other hand, the reproduction port 40 comprises a data management section 41 and a data input/output section 42. The data management section 41 by turn comprises a buffer 43 for temporarily storing the data from the HDD array 110, a P/S 44 for transforming the parallel data from the buffer 43 into serial data and a CPU 45 for controlling the components of the reproduction port 40. On the other hand, the data input/output section 42 comprises a decoder 46 for decoding the serial data input from the P/S 44 and a selector 47 for selecting either the data output from the decoder 46 or the data output from the editing section 51 and supplies them to the output terminal 48.

The editing manager 50 comprises an editing section 51, an interface (I/F) 52 and a CPU 53 and operates to output the data input from the above described recording port 10 and reproduction ports 20, 30, 40 to the video effecter 60, which will be described in greater detail hereinafter, by way of the editing section 51 so that the latter may edit the data. Additionally, the editing manager 50 outputs the data from the video effecter 60 to the selector 13 of the recording port 10 and the selectors 27, 37, 47 of the reproduction ports 20, 30, 40.

The editing section 51 selects the data it needs out of the data input from the recording port 10 and the data coming from the decoders 26, 36, 46 of the reproduction ports 20, 30, 40 typically by means of the selector (not shown) provided therein and outputs the selected data to the video effecter 60. The editing section 51 also outputs the data input from the video effecter 60 to the one of the ports or the CPU 53 by selecting the right destination of the data by means of the selector (not shown) provided therein. Additionally, if the editing section 51 outputs the data input from the recording port 10 and the data coming from the decoders 26, 36, 46 of the reproduction ports 20, 30, 40 to an external monitor, it does so by supplying the data to the output terminal 54.

The I/F 52 is connected to the control panel 70, which will be described in greater detail hereinafter, and outputs the control signal for controlling the control panel 70 and the A/V data input from the CPU 53 to the control panel 70. It also inputs the operation input signals it receives from the control panel 70 to the CPU 53. Additionally, the I/F 52 is connected typically to an external VTR (video tape recorder) to output various commands and also receives various external commands.

The CPU 53 controls the CPU 17 of the recording port 10 and the CPUs 25, 35, 45 of the reproduction ports 20, 30, 40 by executing the editing execution primary stored in the inside.

The CPU 53 that controls the CPUs of the ports simultaneously also operates to output control signals for reading any of the A/V data stored in the HDDs 100, to the HDD array 110 and inputs A/V data. For this operation, the CPU 53 displays the breakdown of the editing operation by reading the material data to be edited according to the VFL and outputting the data to the control panel 70 by way of the I/F 52.

Additionally, the CPU 53 operates for previewing according to the VFL generated by the editing operation in response to an operation input signal for the preview coming from the control panel 70. For this purpose, the CPU 53 reads the VFL stored in the file management section 91 and then the A/V data that the VFL indicates sequentially from the HDDs 100 by way of any of the ports 20 through 40 and outputs them to the control panel 70 by way of the I/F 52.

The video effecter 60 processes the data for specific video effects, utilizing the plurality of ports 20 through 40. More specifically, the video effecter 60 processes the data input from the editing manager 50 for a specific effect such as an effect of picture-in-picture for generating a new time series data by inserting a material data to another material data and connects them together.

The control panel 70 comprises various switches to be operated by the user for selecting the data to be edited and the port to be used for inputting/outputting data and a display section for displaying the images to be used for the editing operation. As the control panel 70 is operated by the user, it generates operation input signals corresponding to the user operation.

The timing manager 80 manages the data bus 120 with timings determined on the basis of video synchronizing signals. The timing manager 80 comprises a timing pulse generator 81 for generating timing pulses, an interface (I/F) 82 operating as interface for connecting the control panel 70 and the timing manager 80 and a CPU 83 for controlling the components of the timing manager 80.

In the timing manager 80, the CPU 83 controls the timing pulse generator 81 so as to make it generate a timing pulse according to an externally input video synchronizing signal and transmit it to the control bus 121. The timing manager 80 manages the right of use of the data bus 120 according to the timing pulse.

The file manager 90 comprises a file management section 91 for holding file management information indicating the storage areas of the files in the HDDs 100 as will be discussed hereinafter and managing files according to the file management information it holds, a network driver 92 connected to external networks such as Ethernet to input data from and output data to the external networks and a CPU 93 for controlling the components of the file manager 90.

The file manager 90 manages the data recorded in the HDD array 110 as will be discussed hereinafter under the control of the CPU 93. For instance, when a file is recorded in one of the HDDs 100, the file manager 90 manages the file recorded in the HDD array 110 by using the file management information including the information showing the address in the HDDs 100 where the file is recorded.

The file management section 91 is also adapted to control the HDD array 110 so as to reproduce any necessary file therefrom simply by specifying the file name of the file in response to the operation input signal applied to it and reproduce material data according to the result of the editing operation on the basis of the virtual files without recording any new data at the time of the editing operation.

The HDD array 110 stores various data in the HDDs 100 and manages the data stored there. The HDD array 110 is connected to the plurality of HDDs $100_1, 100_2, \ldots, 100_{n-3}, 100_{n-2}, 100_{n-1}$ and $100_n$ so as to store various data in the HDDs $100_1, 100_2, \ldots, 100_{n-3}, 100_{n-2}, 100_{n-1}$ and $100_n$ and manage the data stored in the HDDs $100_1, 100_2, \ldots, 100_{n-3}, 100_{n-2}, 100_{n-1}$ and $100_n$. The HDD array 110 comprises a buffer 111, a video data write/read processing section (V) 112 and an audio data write/read processing section (A) 113.

The buffer 111 temporarily stores data when transferring the data between itself and the data bus 120. For example, the data coming from the HDDs 100 are buffered in the buffer 111 before they are output to the data bus 120.

The video data write/read processing section 112 operates for writing video data to and reading video data from the HDDs 100 connected to it. More specifically, the video data write/read processing section 112 selects the right HDD 100 out of the HDDs 100 to write the video data input from the buffer 111 on it or read the necessary audio data from the HDD 100 in order to output them to the buffer 111.

The audio data write/read processing section 113 operates for writing audio data to and reading audio data from the HDDs $100_{n-1}$ and $100_n$ connected to it. More specifically, the audio data write/read processing section 113 selects the right HDD 100 out of the HDDs $100_{n-1}$ and $100_n$ to write the audio data input from the buffer 111 on it or read the necessary audio data from the HDD 100 in order to output them to the buffer 111.

The HDD array 110 is provided with a certain extent of redundancy to show a structure of so-called RAID (Redundant Array of Inexpensive Discs) so that the data to be recorded may be written thereto reliably and the data to be reproduced may be reliably read therefrom. The HDDs $100_1, 100_2, \ldots, 100_{n-3}$ and $100_{n-2}$ are made to show an enhanced level of data transfer performance as they show a RAID structure in order to transfer data in parallel by dividing the data for a plurality of discs and also have a parity disc. Of the HDDs 100, the HDDs $100_{n-1}$ and $100_n$ for storing audio data show a structure of RAID-1 or so-called mirror disc with which data are written in duplicate.

Now, the processing operation of the A/V server 1 for recording the externally input data on the HDDs 100 will be discussed below.

The data input to the input terminal 18 of the A/V server 1 are sent to the encoder 14 by way of the selector 13 of the data input/output section 11 of the recording port 10 and encoded in a predetermined format by the encoder 14. The encoded data are then transformed into parallel data by the S/P 15 of the data management section 12 of the recording port 10 and buffered by the buffer 16. The buffered data are then output to the data bus 120 in the time period of the time slot assigned to the CPU 17 by the timing pulse generator 81 and transferred to the HDD array 110.

The data transferred to the HDD array 110 are then buffered by the buffer 111 and read out from the latter. Of the data read out from the buffer 111, the video data are input to the video data write/read processing section 112, whereas the audio data are input to the audio data write/read processing section 113. The video data write/read processing section 112 divides the input video data by a predetermined unit and determines the parity thereof. Then, it stores the divided data and the obtained parity data in the HDDs $100_1$, $100_2, \ldots, 100_{n-3}, 100_{n-2}$. On the other hand, the audio data write/read processing section 113 stored the input audio data in the two HDDs $100_{n-1}$ and $100_n$. At this time, the file management section 91 generates new file management information including file names and the addresses of the storage areas of the HDDs 100 storing the data according to the stored data.

Thus, the A/V server 1 can record the externally input data in the HDD array by carrying out the above described processing operation.

Now, the processing operation of the A/V server 1 for reproducing any of the data stored in the HDDs 100 and outputting them to the reproduction ports 20 through 40 will be discussed below.

In the A/V server 1, one of the reproduction ports 20, 30, 40 accesses the HDD array 110 in the time slot assigned by the timing pulse generator 81 and requests the HDD array 110 to reproduce the necessary data. Then, the video data write/read processing section 112 of the HDD array 110 reads the video data that are divided and stored in the HDDs $100_1, 100_2, \ldots, 100_{n-3}, 100_{n-2}$ along with the parity data also stored there. Then, it unifies the divided data and performs an error detecting/error correcting operation by referring to the parity data to reproduce the video data. On the other hand, the audio data write/read processing section 113 of the HDD array 110 reads the audio data from the HDD of the two HDDs $100_{n-1}$ and $100_n$ that is free from errors. At this time, the video data write/read processing section 112 and the audio data write/read processing section 113 access the files from which the data are reproduced by referring to the file management information stored in the HDDs 100 or the file management section 91. The reproduced audio/video data are then buffered by the buffer 111 and subsequently read out so as to be transferred to the reproduction port that issued the request for the reproduction by way of the data bus 120.

In the above described processing operation of the A/V server 1 for reproducing data, if the reproduction port 20 issues a request for data reproduction, the data output from the HDD array 110 are input to the buffer 23 of the data management section 21 by way of the data bus 120. The data input to the buffer 23 are then buffered by the buffer 23 and transformed into serial data by the P/S 24. The obtained serial data are then input to the decoder 26 of the data input/output section 22 and decoded by it before being fed to the output terminal 28 by way of the selector 27 and externally output. In this way, the A/V server 1 can reproduce internal materials and output them to the outside.

Now, the operation of the A/V server 1 for editing the externally input data and/or the material data stored in the HDDs 100 will be discussed below.

The A/V server 1 starts an processing operation for editing data according to an operation input signal that is generated by the user operating any of the appropriate buttons arranged on the front surface of the control panel 70. More specifically, the CPU 303 of the control panel 70 defines the IN-point of the time of the starting point from which the operation of editing each of the material data to be edited starts and the OUT-point of the time of the ending point at which the operation of editing the material data ends.

Additionally, the A/V server 1 holds the file system information managed by the above described file management section 91 so that it can reproduce any desired file simply by specifying the file name of the file and can reproduce any internal material according to the outcome of the editing operation without recording the newly prepared data on the basis of the virtual files containing information on the files from which data are reproduced.

More specifically, the A/V server 1 can access any given address of any of the HDDs 100 according to the VFLs and output the necessary editing data on the basis of the VFLs by sequentially reading the recorded material data to the control panel 70 so that the output data may be displayed to the user. In other words, when the A/V server 1 is operating for editing data, it is not required to store the edited data in the HDDs 100. Therefore, the A/V server 1 can use the storage areas of the HDDs 100 in a highly efficient and economic way.

Figure 4:
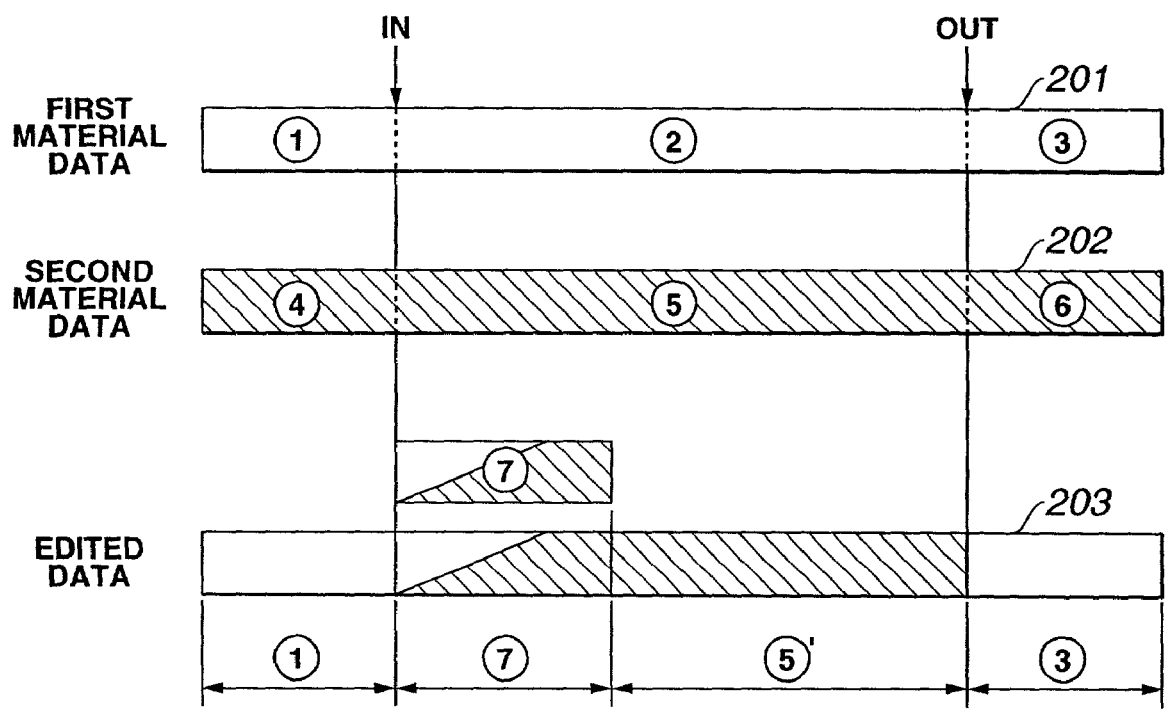
FIG. 4 is a schematic illustration of an editing operation of inserting a second material data in a first material data and processing the data at an IN point for predetermined specific video effects, using the A/V server of FIG. 3.

For instance, the A/V server 1 will perform an operation of processing the edited data 203 obtained by using first material data 201 that are video data and second material data 202 that are also video data for video effects and record the area indicated by "(7)" in the HDD array 110 as shown in FIG. 4 when reproducing the outcome of the editing operation for previewing.

The edited data 203 of FIG. 4 are obtained by inserting the second material data 202 into the area of the first material data 201 starting from the IN-point and ending at the OUT-point. Now, the area of the first material data 201 down to the IN-point is referred to as area "(1)" and the area between the IN-point and the OUT-point and the area after the OUT-point are referred to respectively as area "(2)" and area "(3)", whereas the area of the second material data 202 down to the IN-point is referred to as area "(4)" and the area between the IN-point and the OUT-point and the area after the OUT-point are referred to respectively as area "(5)" and area "(6)". The edited 203 is obtained by editing the first material data 201 and the second material data 202. The edited data 203 contains the area "(1)" and the area "(3)" of the first material, the area "(7)" processed for video effects and the area "(5)" of the second material data obtained by removing the above area "(7)" from the area "(5)" of the second material.

Figure 5:
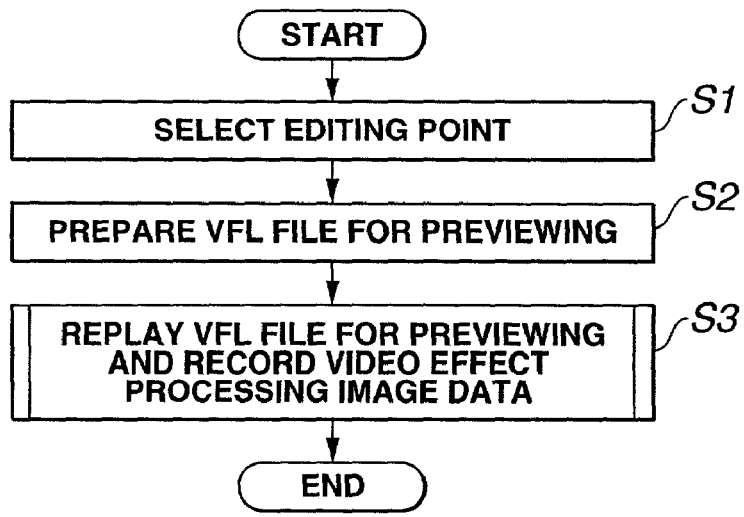
FIG. 5 is a flow chart of an editing operation involving a video effect, using the A/V server of FIG. 3.

Now, the editing operation involving the processing operation for video effects and using the first material data 201 and the second material data 202 that are internal data recorded in the HDD array 110 of the A/V server 1 will be described by referring to the flow chart of FIG. 5.

Assume here that the first material data 201 and the second material data 202 are used to generate a VFL file for previewing and the first material data 201 are read from the HDD array 110 to the reproduction port 30 while the second material data 202 are read from the HDD array 110 of the A/V server 1 to the reproduction port 40 so that the edited data 203 may be output from the output terminal 54.

Firstly, in Step S1, the editing operation starts in response to the input from the control panel 70 and the IN-point and the OUT-point of the first material data 201 and the IN-point and the OUT-point of the second material data 202 are selected. Additionally, the level and other parameters of each video effect is determined by the control panel 70 at each IN-point.

Then, in Step S2, the CPU 53 controls the file management section 91 to make the latter prepare a VFL file for previewing by using the IN-points, the OUT-points and the parameters of the video effects selected in Step S1.

In Step S3, the CPU 53 reproduces the areas defined by the editing points (the IN-points and the OUT-points) and the areas processed for video effects of the first material data 201 and the second material data 202 to output the image prepared on the basis of the VFL file for previewing. If the material data are processed for video effects at any of the editing points, the image data for the related area are output to the recording port 10 and recorded in the HDD array 110 so as to generate a new VFL file corresponding to the storage areas of the HDD array 110 storing the image data obtained by performing the processing operation for video effects.

Figure 6:
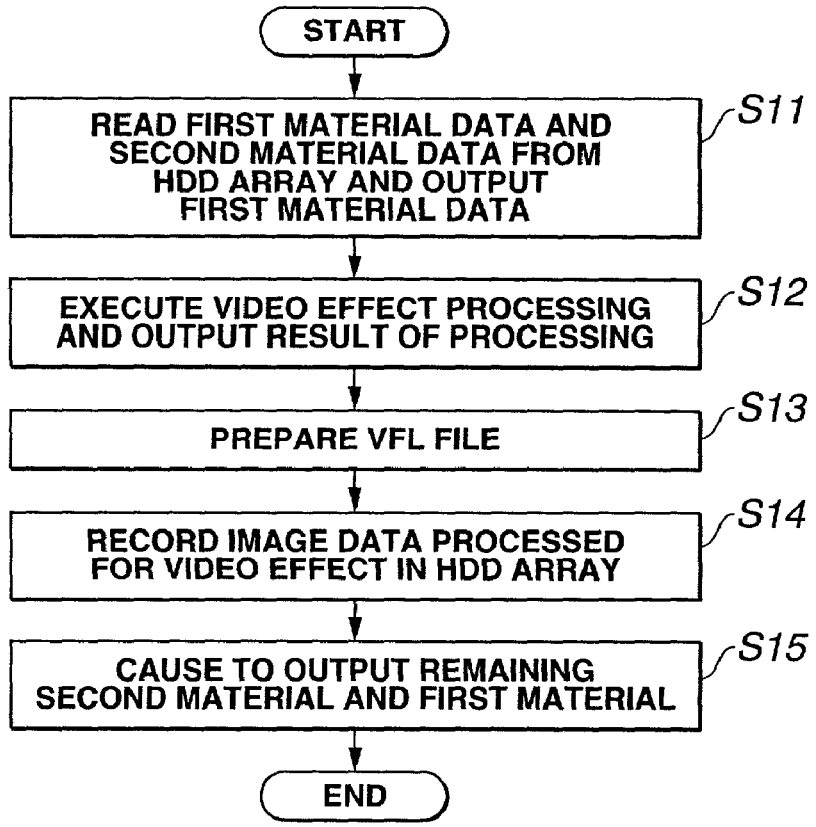
FIG. 6 is a flow chart of an operation of reproducing a VFL for a preview, using the A/V server of FIG. 3.

Now, the processing operation that is performed to reproduce the VFL file for previewing prepared in Step S3 will be discussed by referring to the flow chart of FIG. 6.

Firstly, in Step S11, the first material data as shown in FIG. 4 are read out to the reproduction port 30 from the HDD array 110 by way of the data bus 120 and, at the same time, the second material data also shown in FIG. 4 are read out to the reproduction port 40 from the HDD array 110 by way of the data bus 120. The first material data 201 read to the reproduction port 30 are then decoded by the decoder 36 and input to the editing section 51 of the editing manager 50. The second material data 202 read to the reproduction port 40 are decoded by the decoder 46 and input to the editing section 51 of the editing manager 50. The CPU 53 controls the operation so as to make the first material data input to the editing section 51 to be displayed on the monitor screen from the output terminal 54 until the IN-point comes on the basis of the VFL file for previewing.

Then, in Step S12, the first material data 201 and the image data starting from the IN-point of the second material data 202 are sent to the video effecter 60 from the editing section 51. The video effecter 60 performs a processing operation on the first material data 201 and the second material data 202 that are sent to it for video effects typically including that of dissolving the two sets of material data by fading out the first material data and fading in the second material. However, it may be appreciated that video effects that can be used in this step are not limited to dissolving but a variety of video effects including wiping, fading in and fading out may be used for the purpose of the invention. The image data processed for video effects are then sent back to the editing section 51.

In Step S13, the editing section 51 outputs the image data that have been processed for video effects from the output terminal 54 according to the VFL file for previewing under the control of the CPU 53. Additionally, the CPU 53 of the editing section 51 outputs the image data processed for video effects and sent from the video effecter 60 to the recording port 10. At the same, the CPU 53 controls the file management section 91 so make it generate a VFL file for the image data processed for video effects and a VFL file for the second material data that have been modified as a result of having been subjected to a processing operation for video effects. The generated VFL files are then stored in the memory contained in the file management section 91 or in the HDDs 100 as the outcome of the editing operation.

Then, in Step S14, image data that have been processed for video effects and output from the editing section 51 to the recording port 10 are processed at the recording port 10 as ordinary image data and then recorded in the HDD array 110.

Thereafter, in Step S15, the CPU 53 controls the editing section 51 on the basis of the VFL files for previewing to make it output the second material data following the image data processed for video effects and the first material data from the output terminal 54.

With the above described processing operation, the image data processed for video effects are recorded in the HDD array 110 and VFL files are generated. The generated VFL files indicate the recording areas of the HDD array 110 corresponding to the area "(1)", the area "(7)", the area "(5)" and the area "(3)" shown in FIG. 4. Thus, the file management section 91 of the A/V server 1 can output the outcome of the editing operation by reproducing the image data processed for video effects and recorded in the HDD array 110 along with the first material data and the second material data from the HDD array 110 according to the generated VFL files.

What is claimed is:

1. A data recording/reproduction apparatus having a plurality of input/output means for inputting and outputting data, said data including video data and audio data and adapted to record data input through said input/output means on a plurality of sections of a recording medium non-linearly accessible in allocated time slots and adapted to reproduce and output through said input/output means the data recorded on said recording medium, said apparatus comprising:

a recording/reproduction means for recording material data input through said input/output means on said recording medium and reproducing and outputting through said input/output means any of said material data from said recording medium;

a first editing means for
generating a first piece of editing information based on the selection of editing points including
a starting point and an ending point associated with a predetermined storage area storing a first material data, and
a starting point and an ending point associated with a predetermined storage area storing a second material data to be inserted in said first material data, and
an actual insertion of said second material data in said first material data;

a video effect processing means for processing video data in the vicinity of each of said editing points for achieving predetermined specific video effects;

a video-effect-processed data extracting means for extracting the data processed for the video effects by said video effect processing means;

a recording control means for controlling said recording/reproduction means so as to record said video-effect-processed data extracted by said video-effect-processed data extracting means on said recording medium;

a second editing means for inserting said video-effect-processed data recorded by said recording/reproduction means into said first material data, and generating a second piece of editing information used for inserting said second material data as modified by an insertion of said video-effect-processed data into said first material data;

a virtual file generating means for generating at least three files, said at least three files comprising:
a first virtual file describing a first recording area including at least one continuous sub-area of said first material data on said recording medium on the basis of the first piece of editing information generated by said first editing means,
a second virtual file describing a second recording area including at least one continuous sub-area of said second material data on said recording medium on the basis of the second piece of editing information generated by said second piece of editing information, and a third virtual file describing a third recording area including at least one continuous sub-area of said video-effect-processed data on said recording medium; and a reproduction control means for control said recording/reproduction means so as to reproduce the first material data, the second material data and the video-effect-processed data recorded on said recording medium on the basis of the first virtual file, the second virtual file and the third virtual file generated by said virtual file generating means.

2. The data recording/reproduction apparatus according to claim 1, wherein the non-linearly accessible recording medium comprises a plurality of hard discs.

3. A data recording/reproduction method adapted to use a plurality of input/output means for inputting and outputting data, said data including video data and audio data, said data being input through said input/output means on a plurality of sections of a recording medium non-linearly accessible in allocated time slots and reproduce and output through said input/output means the data recorded on said recording medium, said method comprising steps of:

selecting editing points, said editing points including a starting point and an ending point of a first predetermined storage area wherein a first material data is stored, and a starting point and an ending point of a second predetermined storage area wherein a second material data to be inserted in said first material data is stored;

processing the video data in the vicinity of each of said editing points for predetermined specific video effects;

extracting the video-effect-processed data processed for the video effects;

recording said extracted video-effect-processed data extracted on said recording medium;

generating at least three files including a first virtual file describing the recording area of said first material data on said recording medium, a second virtual file describing the recording area of said second material data on said recording medium and a third virtual file describing the recording area of said video-effect-processed data on said recording medium; and reproducing the first material data, the second material data and the video-effect-processed data recorded on said recording medium on the basis of the first virtual file, the second virtual file and the third virtual file generated by said virtual file generating step.

4. The data recording/reproduction method according to claim 3, wherein the non-linearly accessible recording medium comprises a plurality of hard discs.

* * * * *